Sept. 4, 1928.  
G. JAEGER  
1,682,910  
JACKING DEVICE FOR VEHICLE BEDS  
Filed June 22, 1926
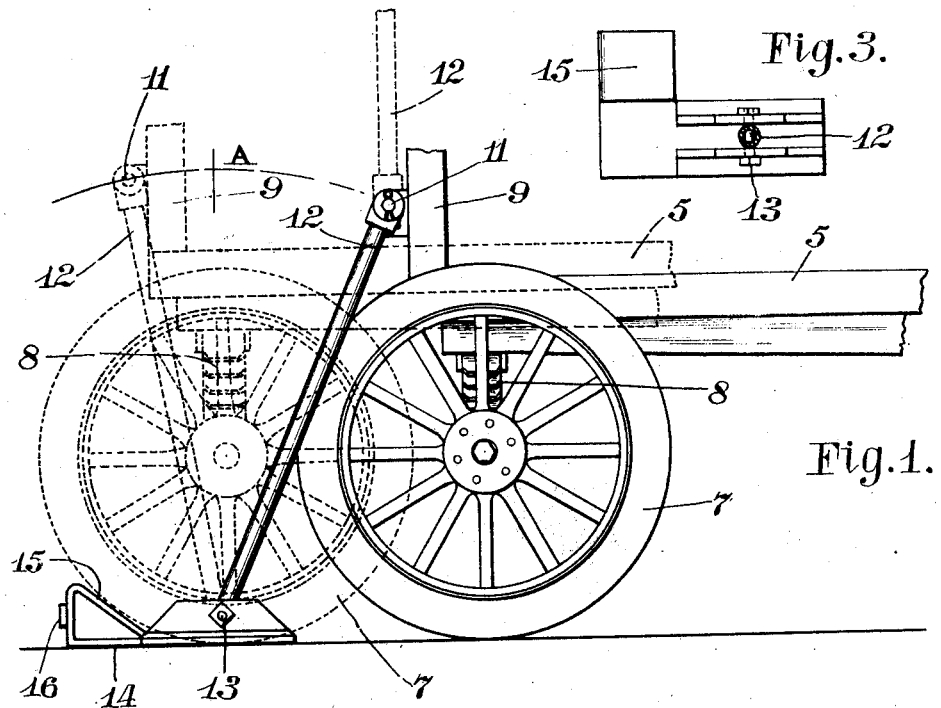
Fig.3.
Fig.1.
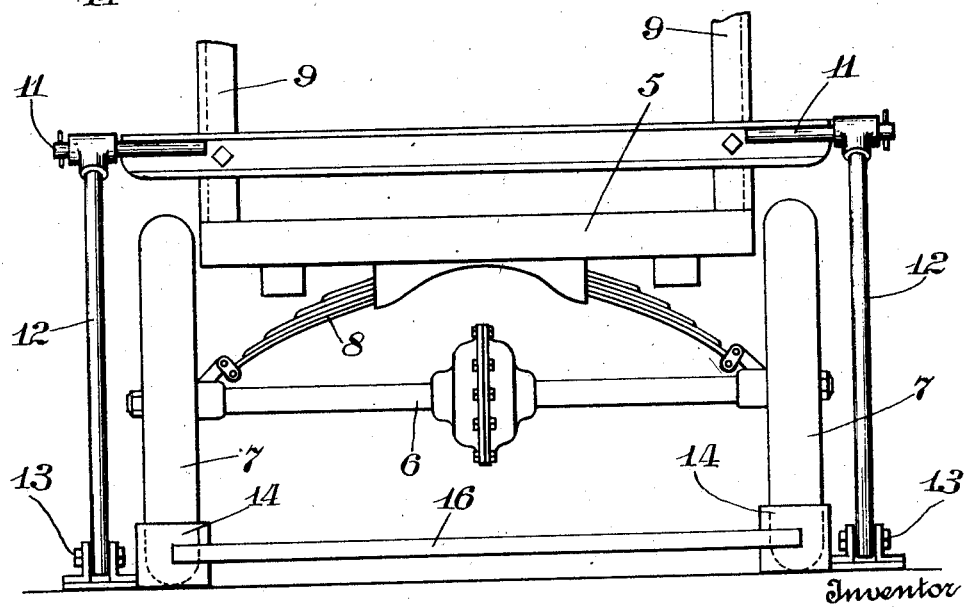
Fig.2.
Inventor  
GEBHARD JAEGER  
his Attorneys Patented Sept. 4, 1928.

1,682,910

UNITED STATES PATENT OFFICE.

GEBHARD JAEGER, OF COLUMBUS, OHIO.

JACKING DEVICE FOR VEHICLE BEDS.

Application filed June 22, 1926. Serial No. 117,727.

A concrete mixing machine including the engine for operating it is often mounted on a wheeled motor driven truck to facilitate the transportation of the machine from place to place. The bed of the truck is mounted on a spring or springs secured to the axle of the rear wheels rendering the support for the machine unstable so that its operation, unless preventive measures be taken, sets up a violent swaying or oscillation of the bed on the springs subjecting them to severe strains endangering their integrity or the security of their fastenings. To give stability to the bed of such a truck it has heretofore been the practice to use two screw jacks to relieve the weight of the bed on the spring and transfer it to the jacks the latter resting on the ground. The use of screw jacks has been troublesome and time consuming and the object of this invention is to dispense with their use and provide improved means whereby the bed can be quickly elevated and firmly supported.

According to the invention there is employed a ground or purchase member and a wheel chock together with a rod pivotally connected with the purchase member and the vehicle bed, such rod adapted, when properly positioned and swung, to elevate the bed in respect of its supporting spring and then retain the bed in elevated position when the vehicle has been moved to cause the wheel to abut against the chock.

The invention is embodied in the example herein shown and described, the feature of novelty being finally claimed.

In the accompanying drawing—

Figure 1 is a view in side elevation of the rear end of the truck showing my invention applied thereto.

Fig. 2 is an elevation looking toward the left hand side of Fig. 1, parts being broken out.

Fig. 3 is a top plan view of the purchase block and chock.

In the views 5 designates the truck bed; 6 the rear or differential axle; 7 the wheels thereon, and 8 the spring connecting the axle and the bed and supporting the latter on the former. The machinery before referred to, not shown, is suitably mounted on the bed.

Fixed to upright frame members 9 at the rear of the bed are stud bearings 11 on which are pivotally hung rods 12. The lower end of each rod has hinged to it at 13 a foot formed with a lateral extension 14 having an inclined chock 15 lying when the rod is lowered to operating position in line with the wheel. If desired two jacking members can be connected together by a rod 16 so that both can be raised and lowered together and any suitable means, not shown, but well understood can be used to hold said jacks in the turned up position as indicated by broken line Fig. 1.

The operation is this: When the rods are in lowered position as shown by full lines in the views and the truck is "backed" until the wheel abuts against the chock the upper end of the arm is swung on an arc to the position shown by broken lines Fig. 1. In this movement the chocking device remains stationary on the ground and arrests the movement of the wheel shortly after the bearing 11 has passed the peak A of the arc but before said bearing and consequently the bed have descended to normal position. Because the wheel can go no farther rearward and because the load of the bed must be lifted to draw the bearing 11 and bed again to the original free position the bed and rod are locked in broken line position pending the application of the necessary force in the contrary direction to move the bearing forward over the peak of the arc. Such force, of course, in the construction shown is in the forward movement of the vehicle.

The lifting movement required to lift and sustain the load of the bed and its machinery is quite slight so that it is not necessary to lift the bed so high that the wheels are removed from the ground and the traction thereof lost. This operation is important where the rear wheels are driven ones as is the case with all or most motor driven trucks.

The forms of the parts can be changed without departing from the gist of the invention as claimed.

What I claim is:

1. Means for relieving the weight of a wheeled vehicle bed on its supporting spring, including a ground purchase member and wheel chock connected together, a rod pivotally connecting the purchase member and vehicle bed, said rod adapted to elevate the bed in respect to its supporting spring when the vehicle wheel is moved toward the chock, said chock limiting the movement of the wheel while the bed is in elevated position.

2. Means for relieving the weight of a wheeled vehicle bed on its supporting spring, including a ground purchase member and wheel chock connected together, a rod pivotally connecting the purchase member and vehicle bed, said rod adapted to elevate the bed in respect to its supporting spring when the vehicle wheel is moved toward the chock and means for retaining the bed in raised position, said chock adapted to limit the movement of the rod after its connection with the bed has passed the peak of the arc of its swing in elevating the bed.

GEBHARD JAEGER.